(12) United States Patent
Cho et al.

(10) Patent No.: US 10,979,243 B2
(45) Date of Patent: Apr. 13, 2021

(54) ELECTRONIC DEVICE AND METHOD FOR PROVIDING NOTIFICATION SERVICE THEREFOR

(71) Applicant: SAMSUNG ELECTRONICS CO., LTD., Suwon-si (KR)

(72) Inventors: Chi-hyun Cho, Seoul (KR); Jae-sick Shin, Siheung-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/465,286

(22) PCT Filed: Nov. 16, 2017

(86) PCT No.: PCT/KR2017/013042
§ 371 (c)(1),
(2) Date: May 30, 2019

(87) PCT Pub. No.: WO2018/110840
PCT Pub. Date: Jun. 21, 2018

(65) Prior Publication Data
US 2019/0394063 A1    Dec. 26, 2019

(30) Foreign Application Priority Data
Dec. 14, 2016    (KR) .................. 10-2016-0170543

(51) Int. Cl.
*H04L 12/28* (2006.01)
*H04W 4/60* (2018.01)
*H04W 4/12* (2009.01)

(52) U.S. Cl.
CPC .......... *H04L 12/2825* (2013.01); *H04W 4/12* (2013.01); *H04W 4/60* (2018.02)

(58) Field of Classification Search
CPC ....... H04L 67/306; H04L 67/18; H04L 67/20; H04L 67/22; H04L 67/26; G06F 16/9537;
(Continued)

(56) References Cited

U.S. PATENT DOCUMENTS 6,647,257 B2 * 11/2003 Owensby .......... H04M 3/42348
455/414.1
7,035,653 B2 * 4/2006 Simon .................... G06Q 30/02
455/466

(Continued)

FOREIGN PATENT DOCUMENTS

KR    10-0596393    7/2006
KR    10-1220831    1/2013
(Continued)

OTHER PUBLICATIONS

International Search Report for PCT/KR2017/013042 dated Feb. 28, 2018, 4 pages, with English Translation.
(Continued)

*Primary Examiner* — Matthew C Sams
(74) *Attorney, Agent, or Firm* — Nixon & Vanderhye, P.C.

(57) ABSTRACT

An electronic device is disclosed. The electronic device comprises: a communication unit for performing communication with at least one external electronic device; and a processor for receiving, from the external electronic device, interest information of a user in the external electronic device and system information in the external electronic device, comparing the received interest information and system information with notification service information of the electronic device, and determining whether the user registers a notification service.

8 Claims, 12 Drawing Sheets

(58) Field of Classification Search
CPC .......... G06F 16/24578; G06Q 30/0261; G06Q 30/0269; G06Q 30/0251; G01C 21/3679; H04W 4/029; H04W 4/02; H04W 4/021; H04W 4/024
See application file for complete search history.

(56) References Cited

U.S. PATENT DOCUMENTS

| | | | | |
|---|---|---|---|---|
| 7,860,923 | B2* | 12/2010 | Singer | H04L 67/14 709/203 |
| 9,146,129 | B1* | 9/2015 | Furio | G01C 21/3679 |
| 9,178,933 | B1* | 11/2015 | Soland | H04L 67/306 |
| 9,195,703 | B1* | 11/2015 | Kirmse | G06Q 10/02 |
| 9,860,713 | B2 | 1/2018 | Seok et al. | |
| 2003/0087652 | A1* | 5/2003 | Simon | H04L 67/28 455/466 |
| 2005/0132016 | A1* | 6/2005 | Boone | H04L 67/26 709/207 |
| 2008/0097867 | A1* | 4/2008 | Engle | G06Q 40/04 705/26.7 |
| 2009/0005079 | A1* | 1/2009 | Shields | G06F 16/29 455/456.3 |
| 2009/0177517 | A1* | 7/2009 | Nichols | G06Q 10/06 705/7.12 |
| 2009/0258636 | A1* | 10/2009 | Helvick | H04L 51/38 455/414.2 |
| 2010/0331016 | A1* | 12/2010 | Dutton | H04W 4/18 455/456.3 |
| 2011/0113084 | A1* | 5/2011 | Ramnani | G06Q 30/02 709/201 |
| 2012/0066316 | A1* | 3/2012 | Petersen | H04L 67/22 709/206 |
| 2012/0150853 | A1* | 6/2012 | Tang | G06F 16/24575 707/728 |
| 2012/0166432 | A1* | 6/2012 | Tseng | G06Q 30/0261 707/728 |
| 2012/0271883 | A1* | 10/2012 | Montoya | H04W 4/21 709/204 |
| 2013/0144717 | A1* | 6/2013 | Williams | G06Q 30/0251 705/14.53 |
| 2013/0243278 | A1* | 9/2013 | Saito | G06K 9/00281 382/128 |
| 2014/0237042 | A1* | 8/2014 | Ahmed | H04L 67/02 709/204 |
| 2015/0006296 | A1 | 1/2015 | Gupta et al. | |
| 2015/0038170 | A1* | 2/2015 | Leicht | H04W 24/00 455/456.3 |
| 2015/0067154 | A1 | 3/2015 | Ly et al. | |
| 2015/0269152 | A1* | 9/2015 | Rekhi | G06Q 10/047 707/748 |
| 2016/0014176 | A1* | 1/2016 | Ariav | H04W 4/023 709/219 |
| 2016/0125469 | A1* | 5/2016 | Tseng | G06F 16/24 705/14.58 |
| 2016/0353235 | A1* | 12/2016 | Williams | H04W 4/14 |
| 2017/0016736 | A1* | 1/2017 | Chen | G01C 21/3644 |

FOREIGN PATENT DOCUMENTS

| | | |
|---|---|---|
| KR | 10-2013-0108874 | 10/2013 |
| KR | 10-2014-0099442 | 8/2014 |
| KR | 10-2014-0133620 | 11/2014 |
| KR | 10-2015-0066663 | 6/2015 |
| KR | 10-2015-0091200 | 8/2015 |
| KR | 10-1548227 | 8/2015 |
| KR | 10-2016-0040751 | 4/2016 |
| WO | WO-2016142741 A1 * | 9/2016 ............. H04W 4/08 |

OTHER PUBLICATIONS

Written Opinion of the ISA for PCT/KR2017/013042 dated Feb. 28, 2018, 11 pages, with English Translation.
Extended Search Report dated Oct. 24, 2019 in counterpart European Patent Application No. EP17880633.7.
Zarko, Ivana Podnar et al. "IoT data management methods and optimisation algorithms for mobile publish/subscribe services in cloud environments," 2014 European Conference on Networks and Communication (EUCNC), IEEE, Jun. 23, 2014, pp. 1-5, retrieved Aug. 22, 2014.
Antonic, Aleksandar et al, "Comparison of the CUPUS middleware and MQTT protocol for smart city services," 2015 13th International Conference on Telecommunications (CONTEL), IEEE, Jul. 13, 2015, pp. 1-8, retrieved Aug. 31, 2015.

* cited by examiner

ELECTRONIC DEVICE AND METHOD FOR PROVIDING NOTIFICATION SERVICE THEREFOR

This application is the U.S. national phase of International Application No. PCT/KR2017/013042 filed Nov. 16, 2017 which designated the U.S. and claims priority to KR Patent Application No. 10-2016-0170543 filed Dec. 14, 2016, the entire contents of each of which are hereby incorporated by reference.

BACKGROUND

1. Field

The disclosure relates to an electronic device and a method for providing a notification service therefor, and more particularly, to an electronic device constituting an Internet of things environment and a method for providing a notification service therefor.

2. Description of Related Art

In accordance with development of electronic technologies, a number of network environments such as a home network and Internet of things have emerged. In particular, the Internet of things (IoT) means a technology in which a sensor and a communication function are embedded in various things to be connected to the Internet. Here, the things may be various embedded systems such as a home appliance, mobile equipment, and a wearable computer. The things to be connected to the IoT need to have unique Internet protocols (IPs) for distinguishing themselves to be connected to the Internet, and a sensor may be embedded in the things to acquire data from an external environment.

Meanwhile, in the IoT environment, electronic devices connected to the network provide a notification service. According to the related art, in order to receive the notification service, a user searches for a desired notification service and subscribes to the searched notification service to receive the notification service.

However, in the IoT environment, a number of devices provide various notification services. Therefore, a process in which the user directly searches for a device or a service and subscribes to a desired notification service is very complicated and inconvenient.

SUMMARY

The disclosure provides an electronic device for checking, by a service provider, a notification service required by a user based on interest information of the user, making the user subscribe to the notification service, and providing the notification service, and a method for providing a notification service therefor.

According to an embodiment of the disclosure, an electronic device includes: a communication unit configured to perform communication with one or more external electronic devices; and a processor configured to receive interest information of a user of the external electronic device and system information of the external electronic device from the external electronic device and determine whether to register the user in a notification service by comparing the received interest information and the received system information with notification service information of the electronic device.

The processor may identify a matching degree between the received interest information and the notification service information and a matching degree between the received system information and the notification service information, and determine whether to register the user in the notification service based on the identified matching degrees.

The processor may register the user in the notification service as a subscriber for receiving the notification service in a case in which the matching degree between the received interest information and the notification service information is equal to or more than a predetermined first threshold value, and the matching degree between the received system information and the notification service information is equal to or more than a predetermined second threshold value, and the first threshold value may be larger than the second threshold value.

When the user subscribes to the notification service to be the subscriber of the notification service, the processor may provide the notification service to the external electronic device.

In a case in which the matching degree between the received interest information and the notification service information is equal to or more than a third threshold value smaller than the first threshold value, and the matching degree between the received system information and the notification service information is equal to or more than a fourth threshold value smaller than the predetermined second threshold value, the processor may transmit a message for asking whether to register in the notification service to the external electronic device without registering the user in the notification service as the subscriber for receiving the notification service, and the third threshold value may be larger than the fourth threshold value.

The processor may make the user to subscribe to the notification service to be the subscriber of the notification service and transmit the notification service to the external electronic device when a user command for agreeing to subscribe to the notification service is received from the external electronic device.

The interest information may include information on matter that the user desires to receive through the notification service, and the system information may include at least one of a location of the external electronic device and a device specification of the external electronic device.

According to another embodiment of the disclosure, a method for providing a notification service for an electronic device performing communication with one or more external electronic devices, the method includes: receiving interest information of a user of the external electronic device and system information of the external electronic device from the external electronic device; and determining whether to register the user in the notification service by comparing the received interest information and the received system information with notification service information of the electronic device.

In the determining, a matching degree between the received interest information and the notification service information and a matching degree between the received system information and the notification service information may be identified, and whether to register the user in the notification service may be determined based on the identified matching degrees.

In the determining, the user may be made to subscribe to the notification service to be a subscriber of the notification service in a case in which the matching degree between the received interest information and the notification service information is equal to or more than a predetermined first threshold value, and the matching degree between the received system information and the notification service information is equal to or more than a predetermined second threshold value, and the first threshold value may be larger than the second threshold value.

The method may further include: providing the notification service to the external electronic device when the user subscribes to the notification service to be the subscriber of the notification service.

In the determining, in a case in which the matching degree between the received interest information and the notification service information is equal to or more than a third threshold value smaller than the first threshold value, and the matching degree between the received system information and the notification service information is equal to or more than a fourth threshold value smaller than the predetermined second threshold value, a message for asking whether to register in the notification service may be transmitted to the external electronic device without registering the user in the notification service as the subscriber for receiving the notification service, and the third threshold value may be larger than the fourth threshold value.

The method may further include: making the user to subscribe to the notification service to be the subscriber of the notification service and transmitting the notification service to the external electronic device when a user command for agreeing to subscribe to the notification service is received from the external electronic device.

The interest information may include information on matter that the user desires to receive through the notification service, and the system information may include at least one of a location of the external electronic device and a device specification of the external electronic device.

According to various embodiments of the disclosure, a service provider checks matter of interest of a user and makes the user subscribe to a notification service corresponding thereto, thereby providing the notification service. Therefore, it is possible to simplify a service subscription procedure and reduce an inconvenience in that the user needs to directly search for services.

DETAILED DESCRIPTION

Figure 1:
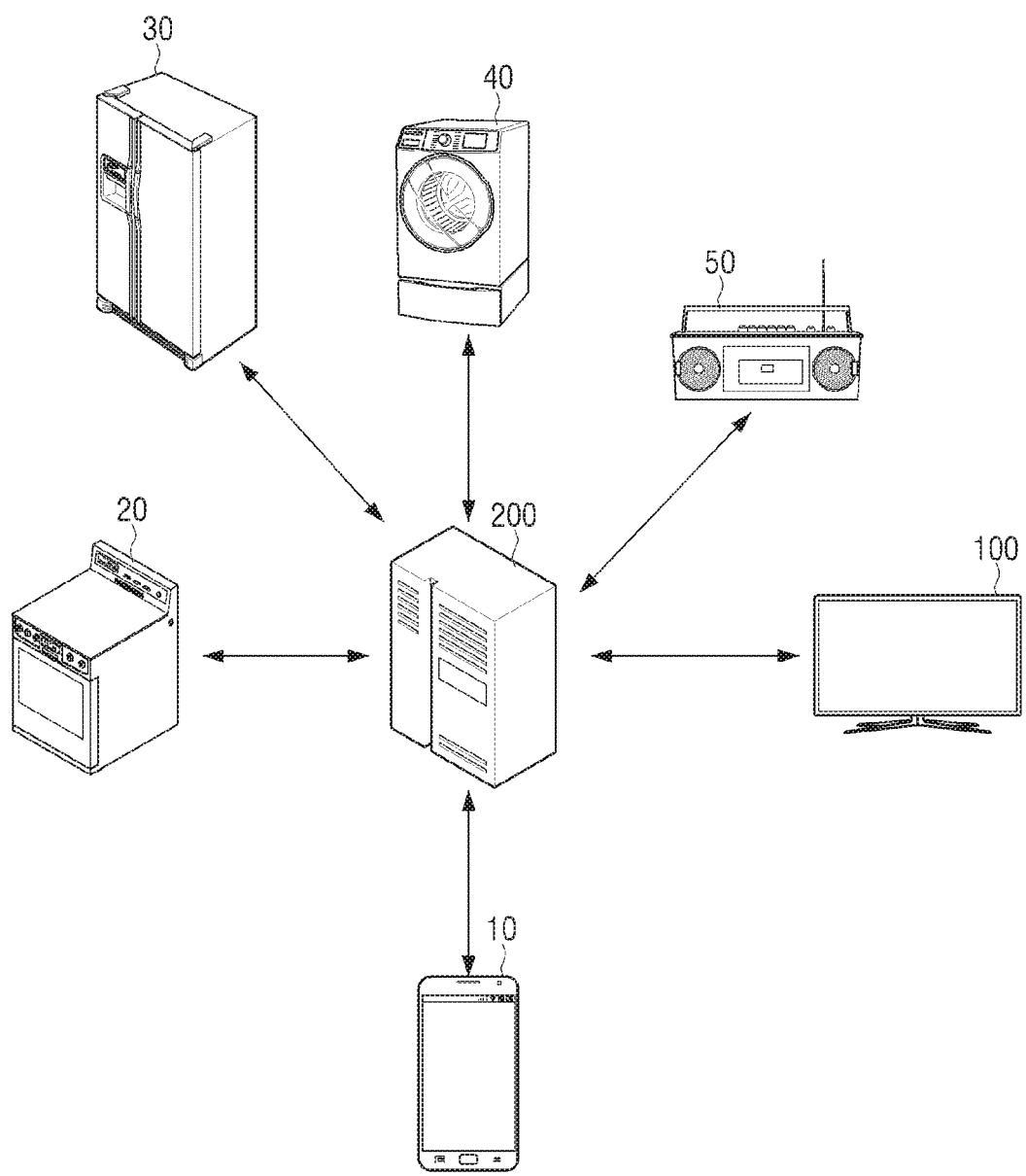
FIG. 1 is a view for describing a notification service providing system according to an embodiment of the disclosure.

General terms that are currently widely used were selected as terms used in the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined based on the meaning of the terms and the contents throughout the disclosure rather than simple names of the terms.

Throughout the specification, unless described to the contrary, "including" any component will be understood to imply the inclusion of other elements rather than the exclusion of other elements. A term "-er/or", "unit", "module", or the like, described in the specification means a processing unit of at least one function or operation and may be implemented by hardware or software or a combination of hardware and software.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted to obviously describe the disclosure, and similar reference numerals will be used to describe similar portions throughout the specification.

Hereinafter, the disclosure will be described in more detail with reference to the accompanying drawings.

FIG. 1 is a view for describing a notification service providing system according to an embodiment of the disclosure.

Referring to FIG. 1, a notification service providing system includes an electronic device 100) and one or more external electronic devices 10 to 50. In this case, the electronic device 100 and the one or more external electronic devices 10 to 50 may constitute an Internet of Things (IoT) environment.

In detail, the electronic device 100 and the one or more external electronic devices 10 to 50 constituting the IoT environment may be connected to each other and perform communication with each other through a server 200 by using various communication networks. However, the disclosure is not limited thereto, and the electronic device 100 and the one or more external electronic devices 10 to 50 may be directly connected to each other and directly perform communication with each other in a device to device (D2C) method without the server 200. In addition, the electronic device 100 and the one or more external electronic devices 10 to 50 may also perform communication with the server 200 through a gateway.

Meanwhile, in the IoT, a type of thing is not limited, and thus types of electronic devices 100, and 10 to 50 constituting the IoT environment are also not limited to a mobile phone 10, an oven 20, a refrigerator 30, a washing machine 40, a radio 50, and a television (TV) 100 illustrated in FIG. 1. For example, the electronic devices 100, and 10 to 50 may also be implemented by a personal computer (PC), an electric fan, a microwave oven, a door-lock, a smart bulb, and the like.

In the IoT environment, electronic devices may perform communication with each other and provide a notification service. Here, a device providing a notification service may be referred to as a service provider, and a device receiving the notification service may be referred to as a consumer.

For example, when washing is completed, the washing machine 40 may provide, to the mobile phone 10, a notification indicating that the washing is completed. As another example, the TV 100 may provide, to the mobile phone 10, schedule information including an airtime, a channel, and the like of a broadcast program.

Meanwhile, in order to receive notification services provided by electronic devices in the IoT environment, the user needed to search for a desired notification service and subscribe to a notification service provided by a service provider, which is inconvenient.

For this reason, in the embodiment of the disclosure, a service provider becomes an agent of subscription, identifies a notification service preferred by the user, and makes the user subscribe to the corresponding notification service, thereby providing the notification service, which will be described in more detail.

Figure 2:
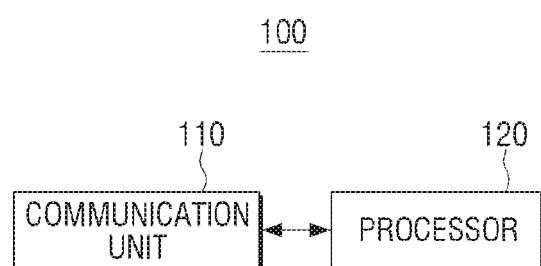
FIG. 2 is a block diagram for describing a configuration of an electronic device according to an embodiment of the disclosure.

FIG. 2 is a block diagram for describing a configuration of the electronic device according to an embodiment of the disclosure.

Referring to FIG. 2, the electronic device 100 includes a communication unit 110 and a processor 120.

The communication unit 110 performs communication with one or more external electronic devices (for example, 10 to 50 in FIG. 1).

In detail, the communication unit 110 may be connected to the server 200 to perform communication with the external electronic device, or may perform communication directly with the external electronic device. Alternatively, the communication unit 110 may be connected to the server 200 through a gateway (not illustrated) to perform communication with the external electronic device.

In this case, the communication unit 110 may perform communication with the external electronic device through various communication networks.

A network that may be used by the communication unit 110 to perform communication with the external electronic device is not particularly limited, and a mobile communication network such as code-division multiple access (CDMA), the global system for mobile communications (GSM), evolved high speed packet access (HSPA+), or long-term evolution (LTE), a near-field communication network such as Wi-Fi, Bluetooth, ultra wide band (UWB), WiBro, WiMax, or Zigbee, a wired communication network such as Ethernet, xDSL (asymmetric digital subscriber line (ADSL) and very-high-bit-rate digital subscriber line (VDSL)), or hybrid fiber coaxial cable (HFC), and the like may be used.

The processor 120 controls a general operation of the electronic device 100. For example, the processor 120 may drive an operating system or an application program to control hardware or software components connected to the processor 120, and perform various kinds of data processing and calculation. In addition, the processor 120 may load and process commands or data received from at least one of other components in a volatile memory, and store various data in a non-volatile memory.

To this end, the processor 120 may be implemented by a dedicated processor (for example, an embedded processor) for performing a corresponding operation or a generic-purpose processor (for example, a central processing unit (CPU) or an application processor) capable of performing corresponding operations by executing one or more software programs stored in a memory device.

First, the processor 120 may receive interest information of the user of the external electronic device and system information of the external electronic device from the external electronic device.

Here, the interest information of the user may include information on matter of interest of the user. That is, the interest information may include matter that the user is interested in and thus desires to receive through a notification service.

In some cases, the interest information of the user may further include information on an external electronic device preferred by the user.

Here, the information on the external electronic device preferred by the user may include information on a name of an electronic device from which the user desires to receive a notification service among electronic devices constituting the IoT environment, a user name of the electronic device, a location of the electronic device, and the like.

Meanwhile, the user may register his/her matter of interest through the external electronic device. In this case, the external electronic device may transmit the input interest information to the electronic devices constituting the IoT environment. Accordingly, the communication unit 110 may receive the interest information of the user from the external electronic device.

Hereinafter, a detailed method through which the user registers the interest information will be described with reference to FIG. 3 by way of example.

Figure 3A:
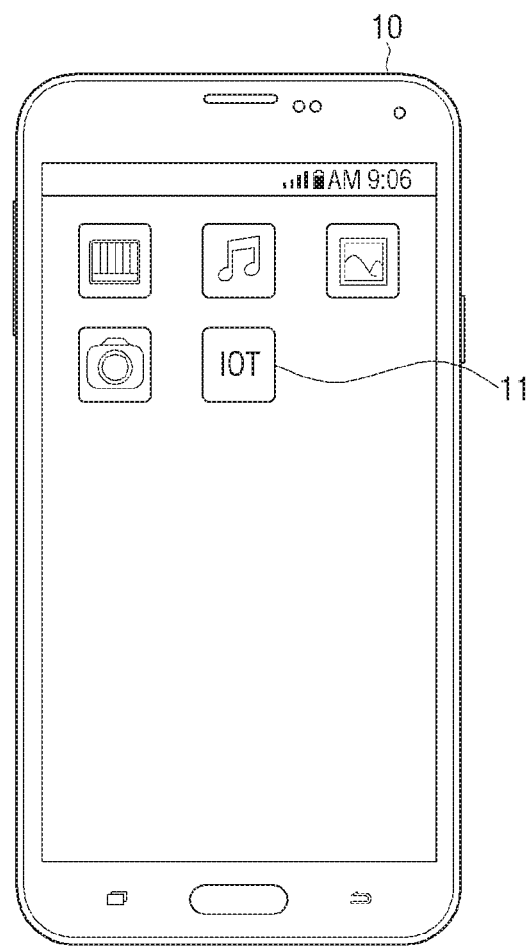
FIGS. 3A, 3B, and 3C are views for describing a method of registering interest information according to an embodiment of the disclosure.

Referring to FIG. 3A, when an application 11 for registering the interest information is selected from a plurality of applications, the mobile phone 10 may execute the application and display an interest information registration screen.

Here, the interest information registration screen may include a user interface for receiving the interest information. Accordingly, the user may register the interest information by inputting matter that the user is currently interested in the user interface. In this case, the user may input the interest information through a virtual keyboard or a physical keyboard.

Figure 3B:
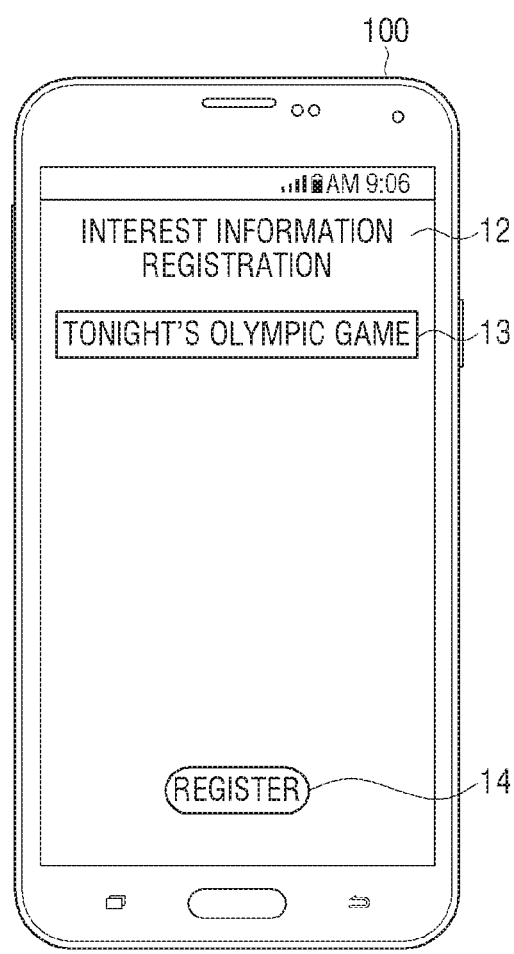

For example, as illustrated in FIG. 3B, the user may input "tonight's Olympic game" in a user interface 13 of an interest information registration screen 12, and select a register button 14, thereby registering the "tonight's Olympic game" as the interest information.

Figure 3C:
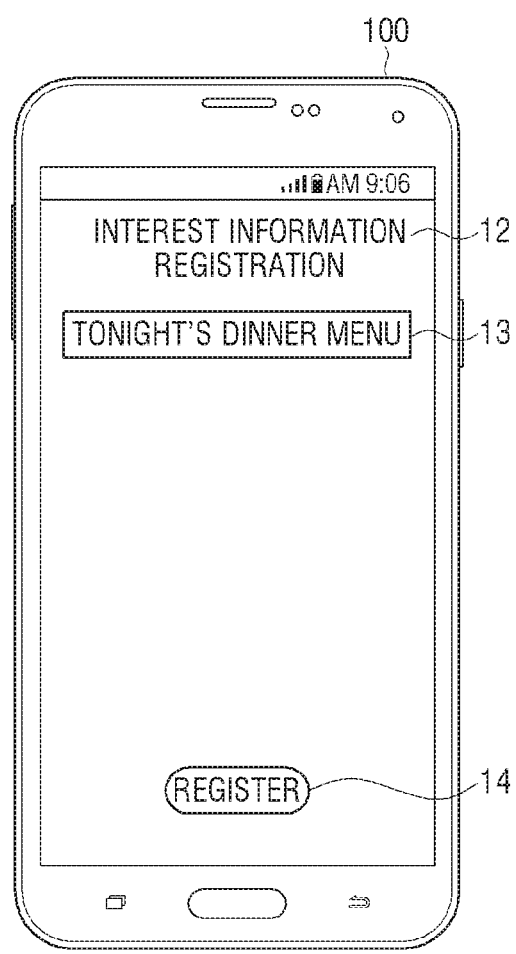

In another example, as illustrated in FIG. 3C, the user may input "tonight's dinner menu" in the user interface 13 of the interest information registration screen 12, and select the register button 14, thereby registering the "tonight's dinner menu" as the interest information.

In this case, once the interest information is registered, the mobile phone 10 may transmit the registered interest information to other electronic devices constituting the IoT environment.

Meanwhile, in the above-described example, the interest information registration screen may further include a user interface for receiving the information on the external device preferred by the user. Therefore, the user may also register the information on the external electronic device preferred by himself/herself as the interest information.

For example, in FIG. 3B, in a case in which the user inputs the "TV" as the external electronic device preferred by himself/herself, the "tonight's Olympic game" and the "TV" may be registered as the interest information.

Meanwhile, the system information of the external electronic device is information associated with a context of the external electronic device, and may include at least one of the location of the external electronic device and a device specification of the external electronic device. Here, the device specification of the external electronic device may include information on whether or not a display or a speaker which can output notification information provided through the notification service as video or audio is present, and network information.

That is, even in a case in which a separate user command is not input, the external electronic device may identify a location thereof through a global positioning system (GPS) or the like, and transmit, to the electronic device 100, the information on the identified location and the device specification of the external electronic device.

Meanwhile, the processor 120 may determine whether to register the user in the notification service by comparing the interest information of the user and the system information of the external electronic device received from the external electronic device, with notification service information of the electronic device 100.

In detail, the processor 120 may identify a matching degree (or a matching rate) between the received interest information and the notification service information and a matching degree between the received system information and the notification service information, and determine whether to register the user in the notification service based on the identified matching degree.

Here, the notification service information may include information on a notification service the electronic device 100 may provide, a name of the electronic device 100, a user name of the electronic device 100, a location of the electronic device 100, and the like.

Further, the matching degree is a value of a degree at which each of the interest information and the system information matches the notification service information. Here, the more the common information is, the relatively higher the matching degree is, and the less the common information is, the relatively lower the matching degree is.

Hereinafter, a method of identifying the matching degree will be described in detail with various examples.

For example, a case in which the electronic device 100 is implemented by a refrigerator located in a home of the user, and a notification service the electronic device 100 may provide is recommendation of a dinner menu is assumed.

Here, in a case in which the interest information of the user received from the mobile phone 10 is the "tonight's dinner menu", the processor 120 may identify that the matching degree between the interest information and the notification service information is 100% based on a fact that the interest information matches the recommendation of a dinner menu which is the notification service the electronic device 100 may provide.

Meanwhile, in a case in which the interest information of the user received from the mobile phone 10 is a "today's lunch menu", the processor 120 may identify that the matching degree between the interest information and the notification service information is 80% by weighting a fact that the interest information partially matches the notification service the electronic device 100 may provide except for a time zone, and a main purpose of the interest information and the notification service is recommendation of a menu.

Further, in a case in which the interest information of the user received from the mobile phone 10 is the "tonight's Olympic game", the processor 120 may identify that the matching degree between the interest information and the notification service information is 0% based on a fact that the interest information does not match the recommendation of a dinner menu which is the notification service the electronic device 100 may provide.

Meanwhile, the processor 120 may identify whether or not a display or a speaker is included in the mobile phone 10 based on information on a device specification received from the mobile phone 10.

Therefore, in a case in which a display or a speaker is included in the mobile phone 10, the processor 120 may identify the matching degree between the system information and the notification service information based on a location of the mobile phone 10.

For example, in a case in which the location of the mobile phone 10 received from the mobile phone 10 is a home of the user, the processor 120 may identify that the matching degree between the system information and the notification service information is 100%.

Further, in a case in which the location of the mobile phone 10 received from the mobile phone 10 is a location within a first predetermined distance (for example, within A km) from the home of the user, the processor 120 may identify that the matching degree between the system information and the notification service information is 80%.

Meanwhile, in a case in which the location of the mobile phone 10 received from the mobile phone 10 is a location within a second predetermined distance (for example, within B km) (Here, A<B) from the home of the user, the processor 120 may identify that the matching degree between the system information and the notification service information is 50%.

Further, in a case in which the location of the mobile phone 10 received from the mobile phone 10 is a location at a predetermined distance or more (for example, B km or more) from the home of the user, the processor 120 may identify that the matching degree between the system information and the notification service information is 0%.

Meanwhile, the above-described method is only an example, and the processor 120 may identify the matching degree between the received interest information and the notification service information and the matching degree between the received system information and the notification service information, through various methods.

Meanwhile, the processor 120 may determine whether to register the user in the notification service based on the identified matching degree.

In detail, the processor 120 may make the user subscribe to the notification service based on the identified matching degree and provide the notification service, or may provide a notification service advertisement and make the user subscribe to the notification service based on a response to the notification service advertisement, rather than directly making the user subscribe to the notification service.

In this case, the processor 120 may use a predefined interest service matching policy.

Here, the interest service matching policy may include information on the matching degree based on which whether to register the user in the notification service or whether or not to provide the notification service advertisement is determined, and may be represented as Table 1 below by way of example.

TABLE 1

|  | Subscription to Notification Service | Provision of Notification Service Advertisement |
| --- | --- | --- |
| Interest Information Matching Degree | A % or more | B % or more |
| System Information Matching Degree | C % or more | D % or more |

Here, it may be assumed that A>B=C>D. As an example, A=100, B=C=80, and D=50. However, this is only an example. That is, B and C may be variously set to values smaller than A and lager than D. For example, values of B and C may be determined to satisfy A>B>C>D or A>C>B>D.

Meanwhile, as described above, the interest service matching policy is determined in order to provide the user with a suitable notification service.

In detail, whether to register the user in the notification service is determined based on the interest information and the system information, and the user is provided with the notification service when the user subscribes to the notification service, and thus the matching degree between the interest information and the notification service information is considered as more important in determining whether to register the user in the notification service as compared to the matching degree between the system information and the notification service information, when determining whether to register the user in the notification service.

Further, in a case in which the matching degree is less than a predetermined value, the notification service may not be an optimum service desired by the user, and thus the user is asked whether to register in the notification service through the notification service advertisement, rather than directly making the user subscribe to the notification service.

Meanwhile, the processor 120 may register the user in the notification service as a subscriber for receiving the notification service in a case in which the matching degree between the received interest information and the notification service information is equal to or more than a predetermined first threshold value, and the matching degree between the received system information and the notification service information is equal to or more than a predetermined second threshold value. Here, the first threshold value is larger than the second threshold value.

That is, referring to Table 1 as described above, the processor 120 may register the user in the notification service as a subscriber for receiving the notification service in a case in which the matching degree between the received interest information and the notification service information is equal to or more than A, and the matching degree between the received system information and the notification service information is equal to or more than C.

Accordingly, when the user subscribes to the notification service to be a subscriber of the notification service, the processor 120 may provide the notification service to the external electronic device. That is, when the user subscribes to the notification service to be a subscriber of the notification service, the processor 120 may provide the notification service to the external electronic device transmitting preference information and the system information. Accordingly, the external electronic device may display information received through the notification service or output the information through a speaker.

For example, a case in which the electronic device 100 is implemented by a refrigerator located in the home of the user, and a notification service the electronic device 100 may provide is recommendation of a dinner menu is assumed. Here, it is assumed that A is 100 and C is 80 in Table 1.

In a case in which the interest information of the user received from the mobile phone 10 is the "tonight's dinner menu", the processor 120 may identify that the matching degree between the interest information and the notification service information is 100%. For example, in a case in which the location of the mobile phone 10 received from the mobile phone 10 is the home of the user, the processor 120 may identify that the matching degree between the system information and the notification service information is 100%.

In this case, the processor 120 may make the user subscribe to the notification service based on the fact that the matching degree between the interest information and the notification service information is 100% and the matching degree between the system information and the notification service information is equal to or more than 80%, thereby transmitting information on a recommended dinner menu to the mobile phone 10.

Meanwhile, in a case in which the matching degree between the received interest information and the notification service information is equal to or more than a third threshold value smaller than the first threshold value, and the matching degree between the received system information and the notification service information is equal to or more than a fourth threshold value smaller than the predetermined second threshold value, the processor 120 transmit a message for asking whether to register in the notification service to the external electronic device without registering the user in the notification service as the subscriber for receiving the notification service. Here, the third threshold value may be larger than the fourth threshold value.

In detail, referring to Table 1 as described above, the processor 120 may transmit a notification service advertisement message to the external electronic device without registering the user in the notification service as the subscriber for receiving the notification service in a case in which the matching degree between the received interest information and the notification service information is equal to or more than B, and the matching degree between the received system information and the notification service information is equal to or more than D.

Thereafter, when a user command for agreeing to subscribe to the notification service is received from the external electronic device, the processor 120 may make the user to subscribe to the notification service to be a subscriber of the notification service and provide the notification service to the external electronic device. That is, when the user subscribes to the notification service to be a subscriber of the notification service, the processor 120 may provide the notification service to the external electronic device transmitting the preference information and the system information. Accordingly, the external electronic device may display information received through the notification service or output the information through a speaker.

For example, a case in which the electronic device 100 is implemented by a refrigerator located in the home of the user, and a notification service the electronic device 100 may provide is recommendation of a dinner menu is assumed. Here, it is assumed that B is 80 and D is 50 in Table 1.

In a case in which the interest information of the user received from the mobile phone 10 is the "today's lunch menu", the processor 120 may identify that the matching degree between the interest information and the notification service information is 80%. Further, in a case in which the location of the mobile phone 10 received from the mobile phone 10 is a location within the second predetermined distance from the home of the user, the processor 120 may identify that the matching degree between the system information and the notification service information is 50%.

In this case, the processor 120 may transmit the message for asking whether to register in the notification service to the mobile phone 10 based on the fact that the matching degree between the interest information and the notification service information is equal to or more than 80% and the matching degree between the system information and the notification service information is equal to or more than 50%.

Accordingly, when the user command for agreeing to subscribe to the notification service is received from the mobile phone 10, the processor 120 may make the user to subscribe to the notification service and transmit information on a recommended dinner menu to the mobile phone 10.

Meanwhile, after the user subscribes to the notification service, the processor 120 may provide the notification service to the external electronic device when a predetermined event occurs.

That is, in a case in which a time to provide the notification service arrives or there is information to be provided through the notification service, the processor 120 may provide the notification service to the external electronic device. In the above-described example, the processor 120 may transmit the information on the recommended dinner menu to the mobile phone 10 every dinner time.

Figure 4:
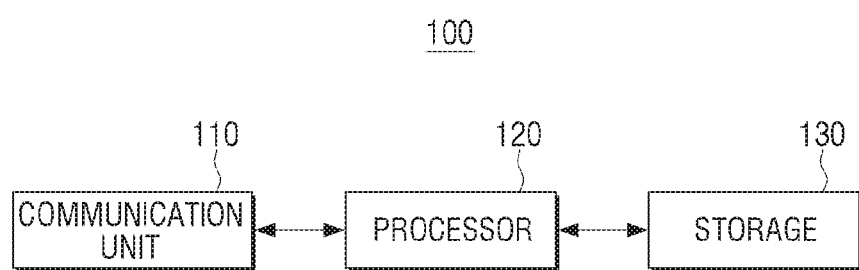
FIG. 4 is a block diagram for describing a detailed configuration of an electronic device according to an embodiment of the disclosure.

FIG. 4 is a block diagram for describing a detailed configuration of the electronic device according to the embodiment of the disclosure.

Referring to FIG. 4, the electronic device 100 may include the communication unit 110, the processor 120, and a storage 130.

Meanwhile, since the communication unit 110 and the processor 120 are described above with reference to FIG. 2, a detailed description therefor will be omitted.

The storage 130 may store information on the interest service matching policy.

Further, the storage 130 may store a command or data received from the processor 120 or other components (for example, the communication unit 110 and the like) or generated by the processor 120 or other components. Interest service Further, examples of the storage 130 may include programming modules such as a kernel, middleware, an application programming interface (API), an application, or the like. The respective programming modules described above may be implemented by software, firmware, hardware, or a combination of two or more thereof.

Meanwhile, the storage 130 may include a storage (not illustrated) implemented by the storage 130, a read only memory (ROM) (not illustrated), a random access memory (RAM) (not illustrated), and a system-on-chip (SoC) (not illustrated) of the processor 120, a memory card (for example, a micro SD card or a USB memory) (not illustrated) mounted in the electronic apparatus 100, and an external storage (for example, a USB memory or the like) (not illustrated) that may be connected to the electronic device 100. In addition, the storage 130 may include a non-volatile memory, a volatile memory, a hard disk drive (HDD), or a solid state drive (SSD).

FIGS. 5A, 5B, 5C, 5D, and 5E are is views for describing a method for providing a notification service according to an embodiment of the disclosure.

In FIGS. 5A, 5B, 5C, 5D, and 5E, the interest service matching policy in which A=100, B=C=80, and D=50 in Table 1 is assumed.

Figure 5A:
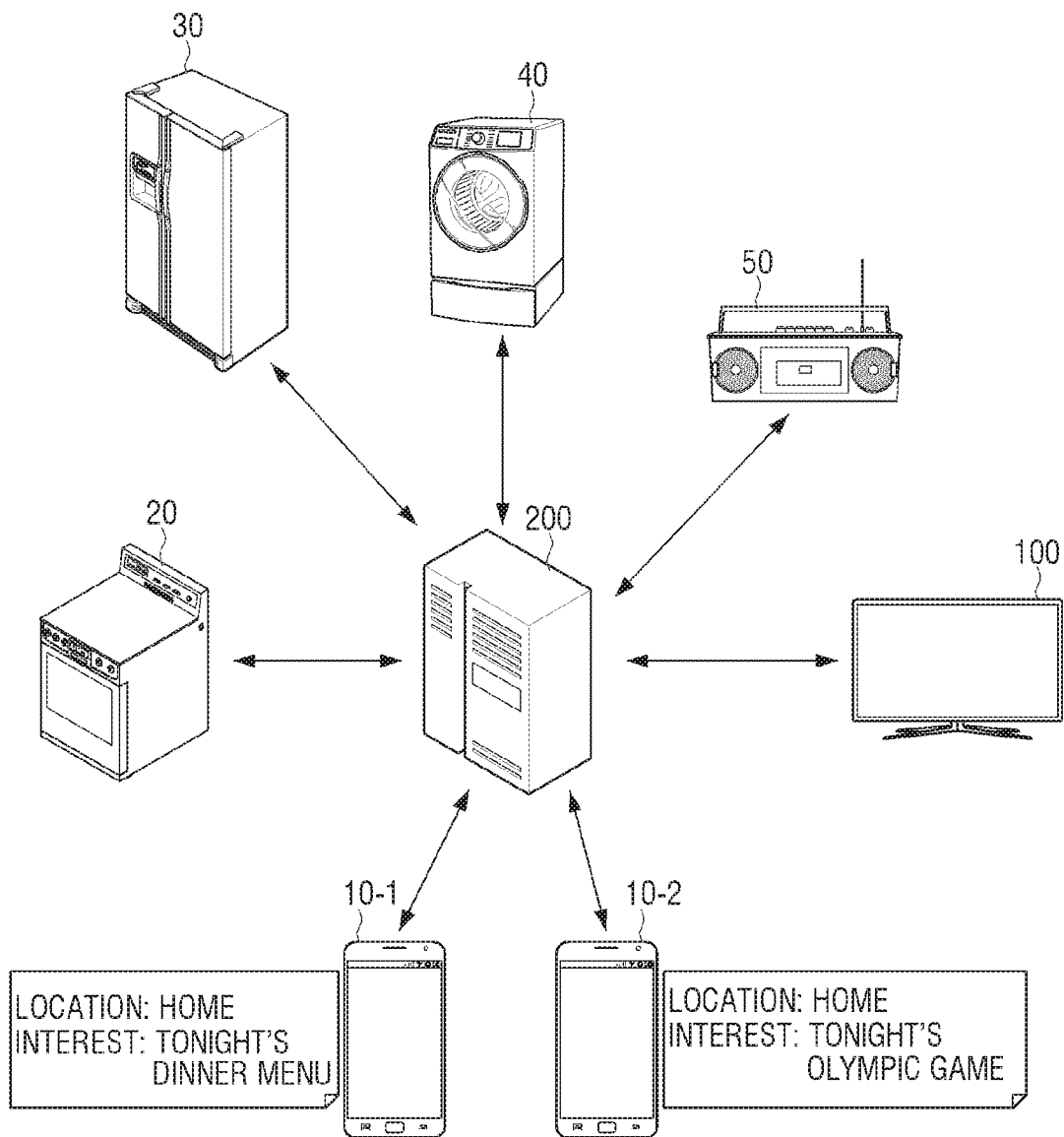
FIGS. 5A, 5B, 5C, 5D, and 5E are views for describing a method for providing a notification service according to an embodiment of the disclosure.
Figure 5B:
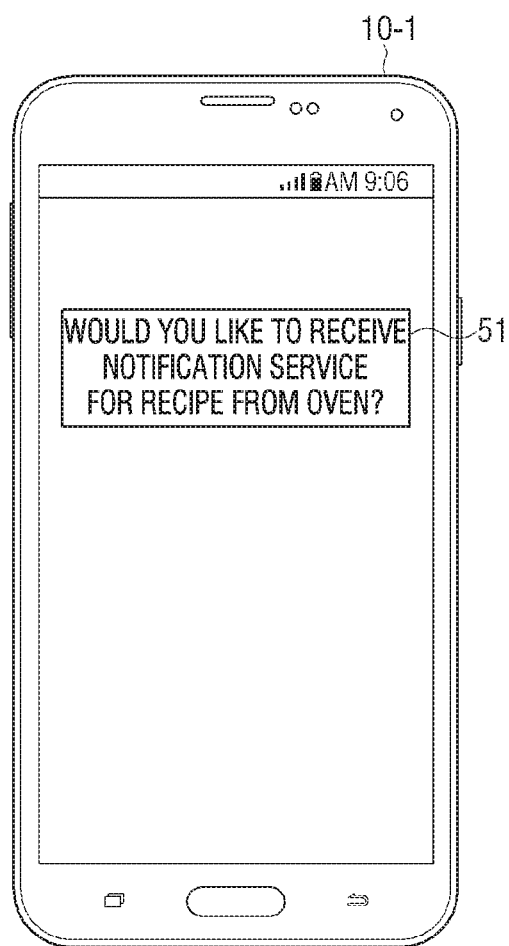
Figure 5C:
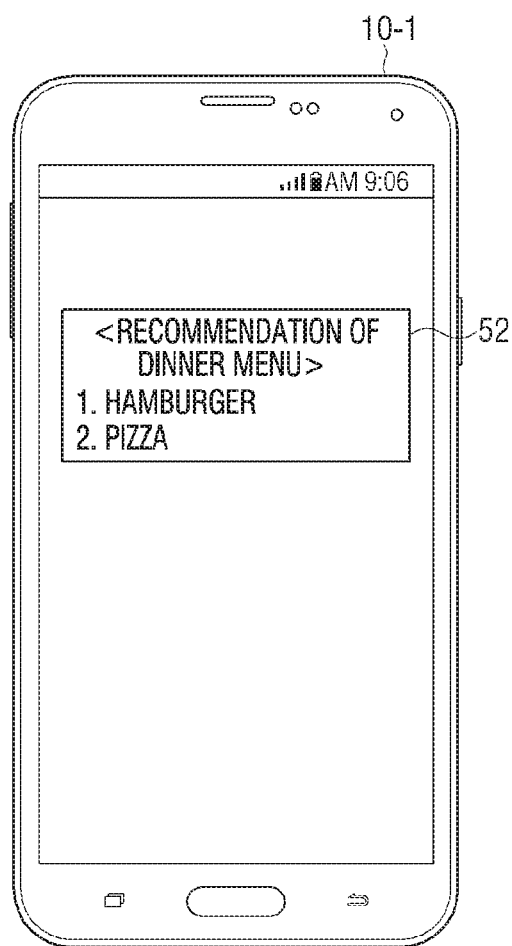
Figure 5D:
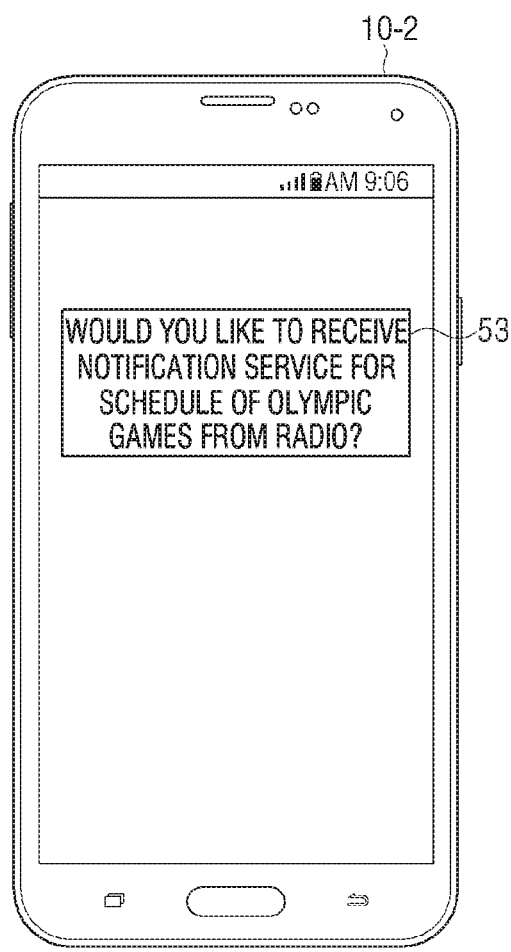
Figure 5E:
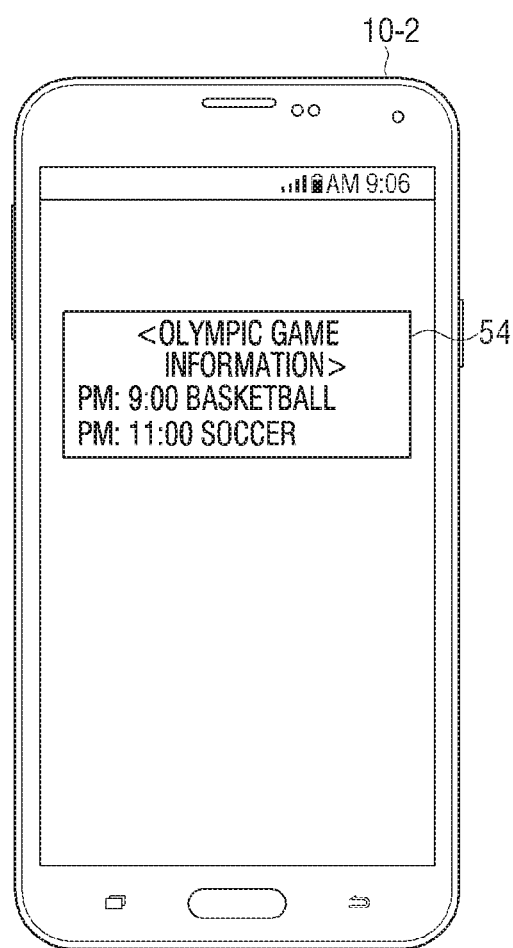

First, referring to FIG. 5A, a mobile phone 10-1, a mobile phone 10-2, an oven 20, a refrigerator 30, a washing machine 40, a radio 50, and a TV 60 may constitute the IoT environment.

In this case, the mobile phone 10-1 may transmit interest information of a user and system information to the oven 20, the refrigerator 30, the washing machine 40, the radio 50, and the TV 60. Here, a case in which the interest information is a "tonight's dinner menu" and a location of the mobile phone 10-1 included in the system information is a home is assumed.

In addition, the mobile phone 10-2 may transmit interest information of a user and system information to the oven 20, the refrigerator 30, the washing machine 40, the radio 50, and the TV 60. Here, a case in which the interest information is a "tonight's Olympic game" and a "TV" and a location of the mobile phone 10-2 included in the system information is a home is assumed.

Further, the oven 20, the refrigerator 30, the washing machine 40, the radio 50, and the TV 60 may compare notification service information with each of the interest information and the system information received from the mobile phone 10-1 and the mobile phone 10-2 to identify a matching degree.

In detail, in a case in which a notification service the oven 20 may provide is a "recipe", the oven 20 may identify that a matching degree between the interest information and the notification service information is 80% based on the fact that although the notification service does not completely match the "tonight's dinner menu" which is the interest information received from the mobile phone 10-1, the oven 20 may provide various menus using the recipe.

Further, the oven 20 may identify that a matching degree between the system information and the notification service information is 100% based on the fact that the location of the mobile phone 10-1 is the home.

Therefore, the oven 20 may provide a notification service advertisement to the mobile phone 10-1 according to the interest service matching policy. That is, the oven 20 may transmit a message for asking whether or not to receive the notification service for the "recipe" to the mobile phone 10-1. In this case, a message 51 illustrated in FIG. 5B may be displayed on the mobile phone 10-1.

Meanwhile, in a case in which a notification service the refrigerator 30 may provide is "recommendation of a dinner menu", the refrigerator 30 may identify that a matching degree between the interest information and the notification service information is 100% based on the fact that the notification service matches the "tonight's dinner menu" which is the interest information received from the mobile phone 10-1.

Further, the refrigerator 30 may identify that a matching degree between the system information and the notification service information is 100% based on the fact that the location of the mobile phone 10-1 is the home.

Therefore, the refrigerator 30 may make the user of the mobile phone 10-1 subscribe to the notification service and provide the notification service according to the interest service matching policy. That is, the refrigerator 30 may transmit information on a recommended dinner menu to the mobile phone 10-1. In this case, a message 52 illustrated in FIG. 5C may be displayed on the mobile phone 10-1.

Meanwhile, in a case in which a notification service the radio 50 may provide is a "radio broadcast schedule", the radio 50 may identify that the interest information matches the notification service information based on the fact that the radio 50 may provide a radio broadcast schedule of the tonight's Olympic game through the notification service.

However, the radio 50 may identify that a matching degree between the interest information and the notification service information is 80% based on the fact that the interest information received from the mobile phone 10-2 includes the "TV".

Further, the radio 50 may identify that a matching degree between the system information and the notification service information is 100% based on the fact that the location of the mobile phone 10-2 is the home.

Therefore, the radio 50 may provide a notification service advertisement to the mobile phone 10-2 according to the interest service matching policy. That is, the oven 20 may transmit a message for asking whether or not to receive the notification service for the "radio broadcast schedule" to the mobile phone 10-2. In this case, a message 53 illustrated in FIG. 5D may be displayed on the mobile phone 10-2.

Meanwhile, in a case in which a notification service the TV 60 may provide is a "TV broadcast schedule", the TV 60 may identify that the interest information matches the notification service information based on the fact that the TV 60 may provide a TV broadcast schedule of the tonight's Olympic game through the notification service.

Further, the TV 60 may identify that a matching degree between the interest information and the notification service information is 100% based on the fact that the interest information received from the mobile phone 10-2 includes the "TV".

Further, the TV 60 may identify that a matching degree between the system information and the notification service information is 100% based on the fact that the location of the mobile phone 10-2 is the home.

Therefore, the TV 60 may make the user of the mobile phone 10-2 subscribe to the notification service and provide the notification service according to the interest service matching policy. That is, the TV 60 may transmit information on the schedule of the tonight's Olympic game to the mobile phone 10-2. In this case, a message 54 illustrated in FIG. 5E may be displayed on the mobile phone 10-1.

Figure 6:
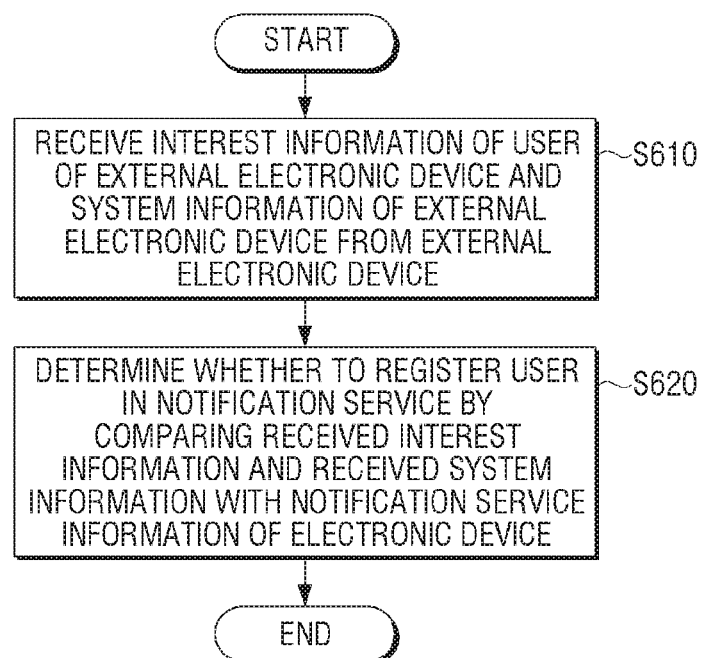
FIG. 6 is a flowchart for describing the method for providing a notification service according to an embodiment of the disclosure.

FIG. 6 is a flowchart for describing the method for providing a notification service according to the embodiment of the disclosure.

First, interest information of a user of an external electronic device and system information of the external electronic device are received from the external electronic device (S610).

Then, whether to register the user in a notification service is determined by comparing the received interest information and the received system information with notification service information of an electronic device (S620).

That is, a matching degree between the received interest information and the notification service information and a matching degree between the received system information and the notification service information are identified, and whether to register the user in the notification service may be determined based on the identified matching degrees.

In detail, the user may be made to subscribe to the notification service to be a subscriber of the notification service in a case in which the matching degree between the received interest information and the notification service information is equal to or more than a predetermined first threshold value, and the matching degree between the received system information and the notification service information is equal to or more than a predetermined second threshold value. In this case, the first threshold value may be larger than the second threshold value.

Further, when the user subscribes to the notification service to be a subscriber of the notification service, the notification service may be provided to the external electronic device.

Meanwhile, in a case in which the matching degree between the received interest information and the notification service information is equal to or more than a third threshold value smaller than the first threshold value, and the matching degree between the received system information and the notification service information is equal to or more than a fourth threshold value smaller than the predetermined second threshold value, a message for asking whether to register in the notification service may be transmitted to the external electronic device without registering the user in the notification service as the subscriber for receiving the notification service. In this case, the third threshold value may be larger than the fourth threshold value.

Thereafter, when a user command for agreeing to subscribe to the notification service is received from the external electronic device, the user may be made to subscribe to the notification service to be a subscriber of the notification service and transmit the notification service to the external electronic device.

Meanwhile, the interest information may include information on matter that the user desires to receive through the notification service, and the system information may include at least one of a location of the external electronic device and a device specification of the external electronic device.

Meanwhile, a non-transitory computer readable medium in which a program sequentially performing the method for providing a notification service according to the disclosure may be provided.

The non-transitory computer-readable medium is not a medium that stores data therein for a while, such as a register, a cache, a memory, or the like, but means a medium that semi-permanently stores data therein and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In addition, although buses are not illustrated in the block diagram of the electronic device, communication between the respective components in the electronic device may be performed through the buses. In addition, a processor such as a CPU, a microprocessor, or the like, performing various operations described above may be further included in the electronic device and a memory for performing various operations described above may be further included in the electronic device.

Further, a component, a module, a unit, or the like in the embodiments of the disclosure may be implemented by hardware, firmware, or software for performing at least one function or operation, or by a combination thereof. For example, the component, the module, the unit, or the like may have an integrated circuit structure like a memory, a processing logic, a lookup table, and the like which may perform each function according to a control by at least one microprocessor or another control device. Further, the component, the module, the unit, or the like may be implemented by a program or a code including at least one command which may be executed in order to perform a specific logic function. Further, the component, the module, the unit, or the like may include a processor such as a CPU or a microprocessor for performing functions thereof. In addition, components, modules, units, or the like may also be integrated in at least one module or chip and be implemented by at least one processor (not illustrated) except for a case in which each of the components, the modules, the units, or the like needs to be implemented by specific hardware.

Although embodiments of the disclosure have been illustrated and described hereinabove, the disclosure is not limited to the above-mentioned specific embodiments, but may be variously modified by those skilled in the art to which the disclosure pertains without departing from the scope and spirit of the disclosure as disclosed in the accompanying claims. These modifications should also be understood to fall within the scope of the disclosure.

The invention claimed is:

1. An electronic device for providing a plurality of notification services, the electronic device comprising:
   a communication unit comprising a communication circuit; and
   a processor configured to:
      based on interest information of a user and system information being received from an external device of a user via the communication unit, identify a first matching degree between the interest information and first information included in notification service information of the plurality of notification services, and identify a second matching degree between the system information and second information included in the notification service information of the plurality of notification services;
      based on the first matching degree and the second matching degree, register the user for a notification service from among the plurality of notification services; and
   control the communication unit to transmit a message for providing the notification service to the external device corresponding to the registered user,
   wherein the system information comprises at least one of location information of the external device or device specification information of the external device.

2. The electronic device as claimed in claim 1, wherein the processor is configured to:
   register the user for the notification service in which the first matching degree is equal to or greater than a first threshold value, and the second matching degree is equal to or greater than a second threshold value, from among the plurality of notification services, and
   wherein the first threshold value is greater than the second threshold value.

3. The electronic device as claimed in claim 2, wherein the processor is configured to:
   register the user for the notification service in which the first matching degree is equal to or greater than a third threshold value less than the first threshold value, and the second matching degree is equal to or greater than a fourth threshold value less than the second threshold value, from among the plurality of notification services, and
   wherein the third threshold value is greater than the fourth threshold value.

4. A method for controlling an electronic device for providing a plurality of notification services, the method comprising:
   receiving, from an external device of a user, interest information of the user and system information of the external device;
   identifying a first matching degree between the interest information and first information included in notification service information of the plurality of notification services, and identifying a second matching degree between the system information and second information included in the notification service information of the plurality of notification services;
   based on the first matching degree and the second matching degree, registering the user for a notification service from among the plurality of notification services; and
   transmitting a message for providing the notification service to the external device corresponding to the registered user,
   wherein the system information comprises at least one of location information of the external device or device specification information of the external device.

5. The method as claimed in claim 4, wherein the registering comprises registering the user for the notification service in which the first matching degree is equal to or greater than a first threshold value, and the second matching degree is equal to or greater than a second threshold value, from among the plurality of notification services, and
   wherein the first threshold value is greater than the second threshold value.

6. The method as claimed in claim 5, wherein the registering comprises registering the user for the notification service in which the first matching degree is equal to or greater than a third threshold value less than the first threshold value, and the second matching degree is equal to or greater than a fourth threshold value less than the second threshold value, from among the plurality of notification services, and
   wherein the third threshold value is greater than the fourth threshold value.

7. A system comprising:
   a first electronic device comprising a first communication unit a user interface configured to receive interest information of a user, and a first processor configured to control the first communication unit to transmit the interest information and system information of the first electronic device, the system information of the first electronic device comprising at least one of location information of the first electronic device or device specification information of the first electronic device; and
   a plurality of second electronic devices, each respective second electronic device providing a notification service and comprising:
   a second communication unit including a communication circuit; and
   a second processor configured to:
      based on the interest information and system information of the first electronic device being received from the first electronic device via the second communication unit, identify a first matching degree between the interest information and first information included in notification service information of the plurality of notification services, and identify a second matching degree between the system information and second information included in the notification service information of the plurality of notification services;
      based on the first matching degree and the second matching degree, register the user for a notification service from among the plurality of notification services, and
   control to transmit, via the communication unit, a message for providing the notification service to the first electronic device corresponding to the registered user.

8. The system as claimed in claim 7, wherein the first electronic device and the plurality of second electronic devices are Internet of Things (IoT) devices.

* * * * *